United States Patent [19]

Stewart

[11] 4,080,981

[45] Mar. 28, 1978

[54] ANTISIPHON CHECK VALVE

[76] Inventor: Anthony F. Stewart, 12091 Nieta Dr., Garden Grove, Calif. 92640

[21] Appl. No.: 731,512

[22] Filed: Oct. 12, 1976

[51] Int. Cl.$^2$ ............................................. F16K 15/14
[52] U.S. Cl. ................................................... 137/218
[58] Field of Search ............................... 137/218, 859

[56] References Cited

U.S. PATENT DOCUMENTS

| 2,233,200 | 2/1941 | Dreyer | 137/218 |
| 3,670,760 | 6/1972 | Butcher et al. | 137/218 |
| 3,951,164 | 4/1976 | Crist | 137/218 |

Primary Examiner—Alan Cohan
Assistant Examiner—Gerald A. Michalsky
Attorney, Agent, or Firm—Gausewitz, Carr & Rothenberg

[57] ABSTRACT

A single diaphragm type of antisiphon check valve assembly is formed of a valve seat and a retainer plug mounted in a valve body to define a valve chamber in which is mounted the single flexible valve diaphragm. The valve chamber is adapted to communicate with an inlet port at one end of the valve body, with an outlet port formed in the retainer plug at the other end of the valve body and also with an air port formed in the same end of the body as the inlet port. The retainer plug and valve seat are constructed to cooperate with the valve body so as to provide a flow reversing relief conduit interconnecting the valve chamber with the air port, all in a simplified snap together valve assembly.

12 Claims, 5 Drawing Figures

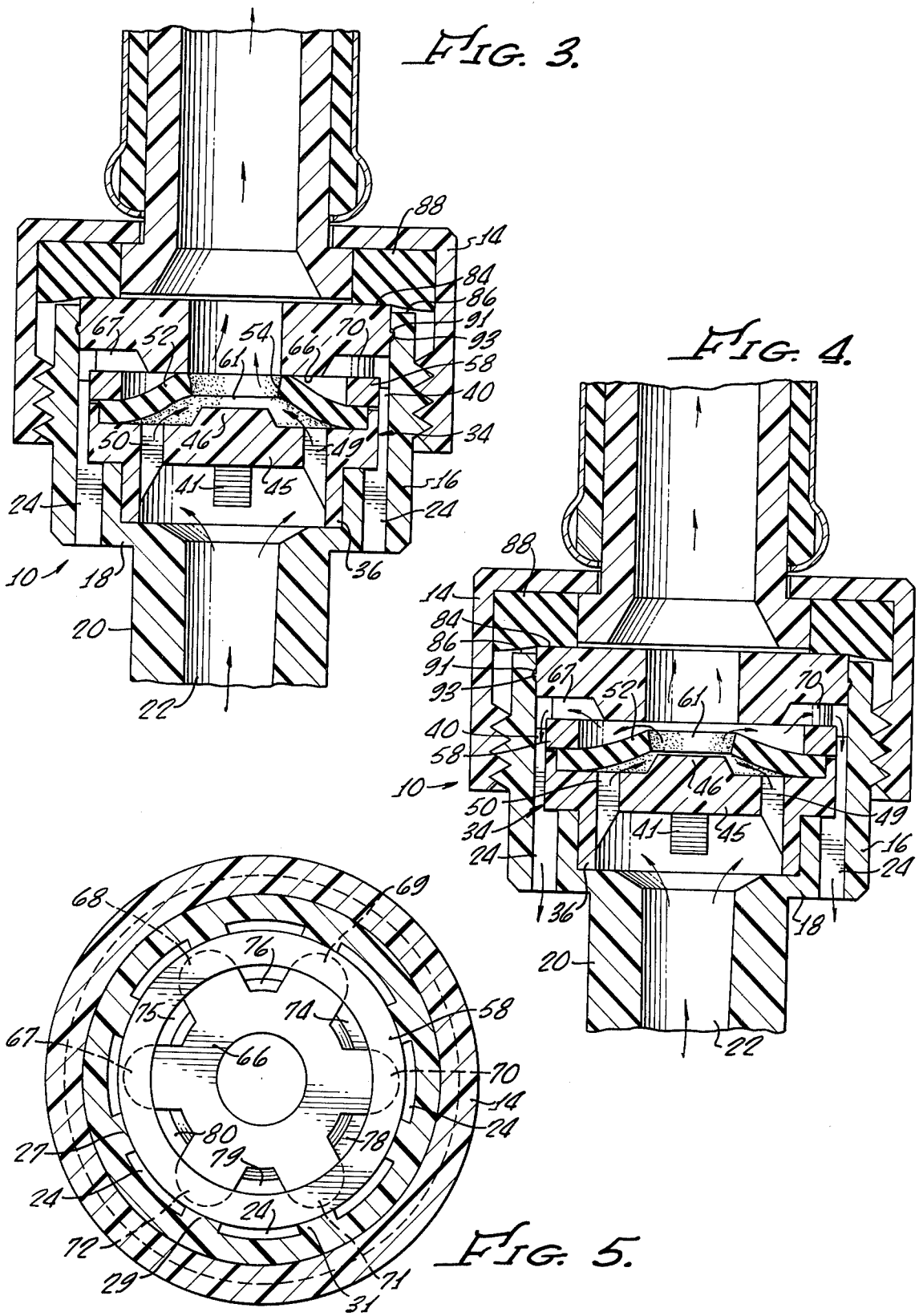

ANTISIPHON CHECK VALVE

BACKGROUND OF THE INVENTION

This invention relates to a combined check valve and siphon preventing valve assembly and more particularly concerns such a valve assembly having a single valve member and improved flow patterns.

Antisiphon check valves are widely used to prevent siphoning of possibly contaminated liquid back into a liquid pressure system. These valves are required by law in many applications, such as, for example, in the connection of recreational vehicle internal water supply systems to a pressurized community water supply system. Valves of this type incorporate a check valve that prevents back flow of water from the using system into the supply system and air ports to prevent siphoning. Undesired siphoning may occur under certain combinations of circumstances unless an antisiphon valve is used. For example, where the check valve malfunctions and the community water supply pressure drops below that of the using system, incipient siphoning may occur, tending to cause water to flow from the using system back into the community system, with a possible contamination of the latter. To eliminate this potential danger, an antisiphoning mechanism is often employed in the connection between a using system and a community system. Such an antisiphon device includes an air or relief port in the valve, this port being normally closed during full flow from the community supply to the using supply, but being open to the atmosphere to avoid potential siphoning conditions.

In a common metallic valve of this type, such as an antisiphon check valve sold by Modern Spec Sales, a flexible diaphragm valve member cooperates with a valve seat to block reverse flow of water through the valve body. The diaphragm valve member is held in place by a retainer plug that screws into the valve body. To provide antisiphon air ports, the retainer plug is provided with ports in communication with the atmosphere and surrounding the valve outlet port, which passes through the relief plug. The valve inlet port is at one end of the valve body and the air ports are at the other end, the outlet end of the valve body. Therefore, in some intermediate flow conditions, water from the inlet port will flow out through both the outlet port and the air port. This flow through the air port, which is toward the using system, and thus toward the user, is highly undesirable even though it only occurs at certain intermediate flow conditions. For this reason, this prior valve of Modern Spec Sales incorporates a separate flow deflector shield mounted at the outlet end of the valve for deflecting water flowing outwardly toward the user from the air ports. This shield adds to the complexity and cost of the valve.

Various valves with dual valve members and of dubious reliability have been suggested. For example, the valve of the patent to Crist U.S. Pat. No. 3,951,164, employs two separate and independently operable air valve and check valve members in a single valve assembly to provide both antisiphon and backflow prevention. The increased number of parts greatly adds to the probability of failure of such a valve and the reliance upon gravity for operation of the valve members further decreases reliability.

Accordingly, it is an object of the present invention to provide an antisiphon check valve that eliminates or minimizes deficiencies of prior valves.

SUMMARY OF THE INVENTION

In carrying out principles of the present invention in accordance with a preferred embodiment thereof, a valve body having an outer wall and a central portion spaced inwardly of the wall to define a plurality of air ports in one end of the valve body has a valve seat mounted to the central portion with a flow passage in the seat communicating with the inlet port. The valve seat is peripherally spaced from the outer wall of the valve body and a valve member for blocking either the flow passage or the air port is provided in the form of an apertured single flexible valve disk seated upon the valve seat. A retainer plug mounted at the other end of the valve body helps to maintain the valve disk upon the valve seat. According to a feature of the invention, relief conduit means are provided to provide a reverse flow from the inlet port of the valve, at one end of the valve body to the air port of the valve, at the same end of the valve body.

BRIEF DESCRIPTION OF THE DRAWINGS

FIG. 3 is a sectional view of the valve assembly of FIG. 1 in full flow condition;

FIG. 4 is a sectional view of the valve of FIG. 1 in a condition of intermediate flow, showing the main flow path and the reverse leakage flow which can occur in some flow conditions; and FIG. 5 is a sectional view of the valve taken on line 5—5 of FIG. 1.

DETAILED DESCRIPTION

Figures 1, 2:
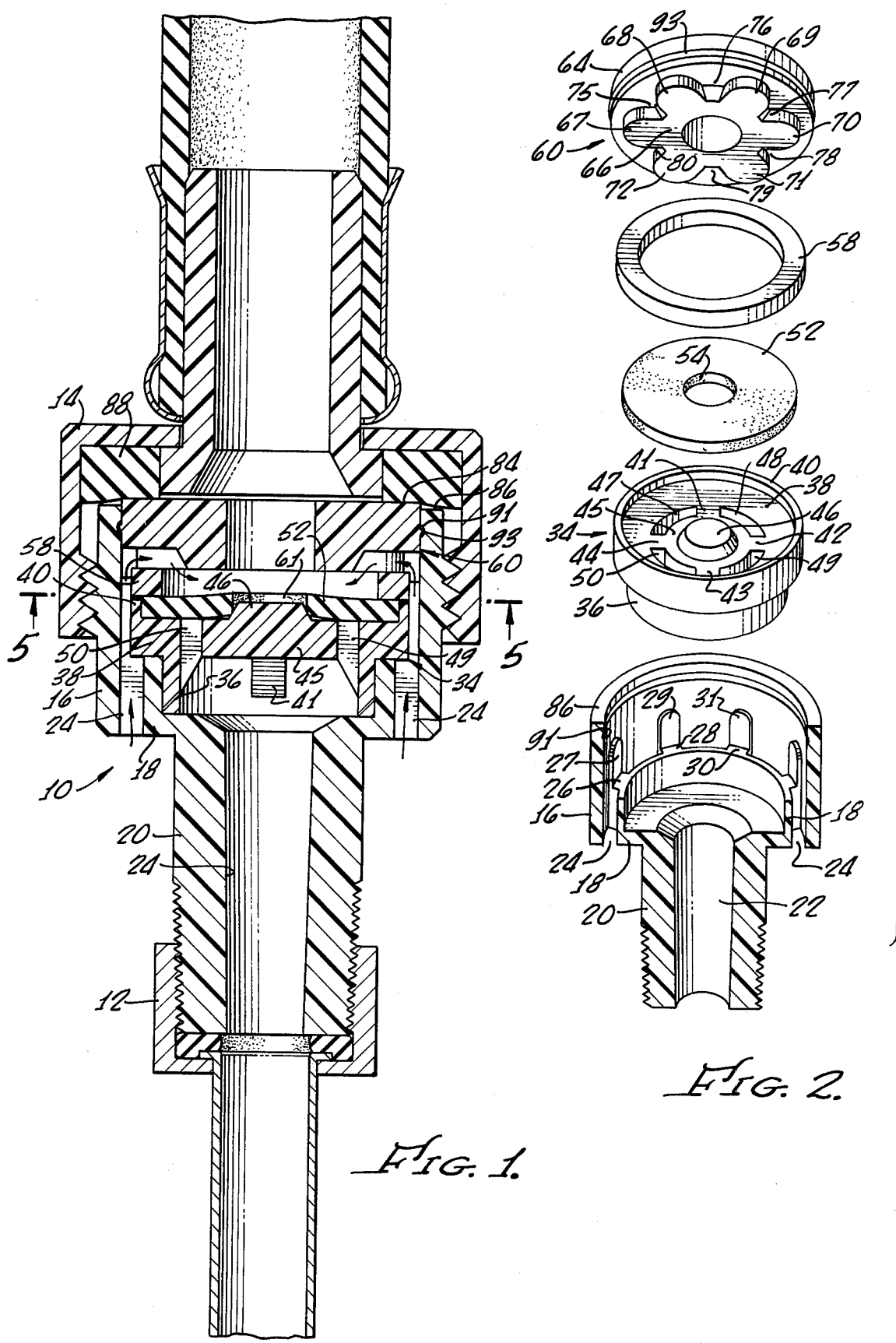
FIG. 1 is a sectional view, greatly enlarged, of an antisiphoning check valve embodying principles of the present invention, showing the valve in closed position.
FIG. 2 is an exploded perspective view, also enlarged, with parts broken away, of elements of the valve assembly of FIG. 1.

As illustrated in FIG. 1, an antisiphon and check valve assembly generally indicated at 10 is provided for connecting a liquid supply system, such as a community water supply (not shown), having an output fitting 12 to a using system (not shown) which may be a shower, bath, sink or the like, of a dwelling or recreational vehicle, having an input connection swivel fitting 14. The valve assembly 10 is screwed or otherwise detachably connected at its input (upstream) end to the community supply fitting 12 and is threadedly connected to the user input fitting 14 at its output (downstream) end.

Valve assembly 10 comprises a valve body having an outer wall 16 of a generally circular cylindrical configuration, and a hub or central portion 18, including an elongated stem 20 that is externally threaded for detachable engagement with internally threaded fitting 12. A liquid inlet port 22 extends through valve body stem 20 and hub 18 at the input end of the valve assembly. A plurality of air ports 24 also extend through the same input end of the valve assembly and are defined between central portion 18 and outer wall 16 and a plurality of circumferentially spaced ribs, such as ribs 26, 28, 30, etc. that fixedly position and interconnect hub 18 and outer wall 16. The ribs have axially extending portions 27, 29, 31 to help position the valve seat to be described below.

A valve seat 34 includes a stub shaft body 36 that is snugly received in a mating recess formed in hub 18. Valve seat body 36 includes a larger diameter valve seat circumferential flange 38 having an upstanding peripheral lip 40. Connected to flange 38 by means of a plurality of radially extending arms 41, 42, 43 and 44, is a valve seat hub 45 having a truncated conical valve seat projection 46 that is centrally located upon the forwardly facing surface of the valve seat hub 45. Thus a plurality of flow passages are provided through the center of the valve seat and through spaces 47, 48, 49 and 50 formed between the hub 45 and flange 38. These flow passages communicate with the inlet port 22 of the central portion of the valve body.

A thin flexible disk or diaphragm 52 of rubber or a soft and resilient plastic or the like, having a central aperture 54, is seated upon the flange 38 within the valve seat lip 40. Valve disk 52 has a thickness slightly greater than the height of the lip 40 and its central aperture 54 is dimensioned to snugly engage the sloping surface of projection 46.

Seated upon the peripheral portion of the forwardly facing surface of flexible valve disk 52 is a valve retainer ring 58 which presses the periphery of the diaphragm valve member 52 against the valve seat and thus firmly secures the outer portion of the diaphragm valve member to the valve seat at all times and in all positions of the valve.

To hold the diaphragm valve member and retainer ring in position upon the valve seat, there is provided a retainer plug 60 having an upper plate portion 64, a hub section 66 and a plurality of circumferentially spaced axially inwardly facing lugs 67, 68, 69, 70, 71, 72. Lugs 67 through 72 define relieved sections of the retainer plug to form portions of a relief conduit means, such portions being designated at 75, 76, 77, 78, 79, 80 (see also FIG. 5).

Retainer plug 60 is axially dimensioned so that when the lugs 67 through 72 are firmly pressed against retainer ring 58, the upper surface 84 of the retainer plug extends slightly beyond the forward or outlet end 86 of the valve body wall 16. With this arrangement the conventional user system fitting 14, which is not a part of the valve assembly, and which includes a conventional washer 88, will press firmly upon the outer end 84 of the retainer plug 60 and, by means of the threaded engagement between fitting 14 and valve body wall 16, will firmly maintain the retainer plug and the other elements of the valve assembly in position.

A valve chamber 61 is defined within the valve body wall between retainer plug 60 and valve seat 34. The diaphragm valve member is movable within this chamber as described below.

The described valve is shown in FIG. 1 in a normal no-flow condition. In the absence of flow from the community system supply conduit fitting 12, diaphragm valve member 52 assumes its normal unstressed nearly flat condition, as shown in FIG. 1, in which its periphery is securely pressed to the valve seat by means of valve retainer ring 58 and in which the edges of the central aperture closely abut and seal against the surface of the valve seat projection 46. In this condition, flow from the downstream end of the valve (from swivel fitting 14) to the upstream end of the valve (community supply fitting 12) is blocked by the check valve action.

In the condition of FIG. 1, the valve member blocks the inlet and flow passage through the valve body and valve seat but allows communication between the valve chamber (defined between the valve seat and the retainer plug) and both of the valve outlet and the air ports 24. The air ports 24 are in communication with the valve chamber by means of a relief conduit having sections defined between the valve body wall and the outer peripheries of both the hub 18 and the valve seat 34. This relief conduit also includes a plurality of flow passage sections 75 through 80 (FIGS. 2 and 5) which are defined by the retainer ring 58 and the projection lugs 67 through 72 of the retainer plug. Thus, air can flow into the valve chamber 61 through the air ports and through the relief conduit. Should the check valve fail to operate and should a lower pressure exist in the community water supply connected with fitting 12 (and with a relatively higher pressure in the system or line downstream of the valve), a siphoning flow would then to occur through the valve in a reverse direction (from fitting 14 toward fitting 12). However, any such siphoning flow is prevented by the relief conduit which vents the valve chamber 61 to the atmosphere by the air ports. In this position of the valve assembly air can flow to chamber 61 from the air ports 24 as indicated by the arrows in FIG. 1.

Full flow condition of the valve is illustrated in FIG. 3, wherein water flows from the community supply system through the valve inlet port 22, through the flow passages in the valve seat into the valve chamber 61. Pressure of this flowing water has deflected the inner portion of the flexible valve diaphragm member 52 toward the downstream end of the valve as shown in FIG. 3. The outer periphery of the valve diaphragm is still firmly secured and sealed to the valve seat, but the central portion of the valve member adjacent and surrounding the periphery of its central aperture 54 is now pressed and sealed against the central portion 66 of the valve retainer plug, whereby the valve chamber is now in communication with the outlet port of the plug. In this flow condition of the valve, the relief conduit is blocked by the valve member 52 and no water or air can flow between the valve chamber and the air ports. Further, in this flow position, the valve chamber communicates with both the flow passage in the valve seat (and also the valve inlet port) and the outlet port of the retainer plug. Water flow is indicated by the arrows.

In single diaphragm valves of the type disclosed herein, the flexible diaphragm may occasionally assume an intermediate position (shown in FIG. 4) in which the central portion of the valve disk has moved from its closed position to unblock the flow passage that communicates with the valve inlet port, but has not moved downstream sufficiently to fully seal and block communication between the valve chamber and the air ports. Such a condition can occur at certain low levels of flow or for a short time during transition between the closed position of FIG. 1 and the full flow condition of FIG. 3. In this condition, as illustrated in FIG. 4, water flowing in via the liquid inlet port will not only flow outwardly of the valve via its outlet port in the retainer plug, but will also flow outwardly of the valve via the relief conduit means and the air ports, all as indicated by the arrows in FIG. 4. This flow of water from the air ports is directed through a reverse flow path within the valve body and caused to flow outwardly of the valve body from the end at which the inlet port is located. Thus, a user of the valve holding a liquid flow line such as a flexible shower or brush line, will not be sprayed with water ejected from air ports at the downstream end of the valve as commonly occurs in prior single diaphragm antisiphon check valves. As previously mentioned, this reverse flow path is provided by the unique arrangement of parts and configuration that establishes a relief conduit path including flow passage sections defined between retainer plug lugs 67 through 72 and between the valve body wall and the valve seat, where the latter is spaced from the wall by the rib portions 27, 29, 31, etc.

Preferably all of the parts of the valve (except valve member 52) are injection molded of a suitable plastic of high strength and good dimensional stability. Valve member 52 is preferably made of a soft, pliable and resilient rubber or plastic having a shape memory which causes it to return to the closed position shown in FIG. 4. The valve seat and retainer plug are a snug snap fit within the valve body hub and valve body wall respectively. This resilient retention of the plug 60 within the valve body is enhanced by forming mating circumferential groove 91 and ridge 93 in the valve body and plug, respectively. Nevertheless, as previously described, the parts are firmly held in the assembled position by the user system fitting 14 which is threaded down upon the valve body until it firmly presses the retainer plug inwardly of the body.

The thickness of the valve member 52 is made to be equal to or slightly greater than the height of the lip 40 above the valve seat surface 38 to insure a good pressure and contact between the retaining ring 58 and the periphery of the valve member 52.

The described valve is simple, efficient and reliable and provides a highly desirable reverse flow path through the air ports. It is made with a relatively few, easily manufactured parts that are quickly and simply assembled and yet are firmly held in assembled position.

The foregoing detailed description is to be clearly understood as given by way of illustration and example only, the spirit and scope of this invention being limited solely by the appended claims.

I claim:

1. An antisiphon check valve comprising:
   a valve body having a liquid inlet port at one end thereof and means within the body defining an air port at said one end of the valve body,
   a valve seat in said body having a flow passage therethrough communicating with said inlet port,
   a retainer plug in said body cooperating with said valve seat to define a valve chamber therebetween communicating with said flow passage, said plug having a liquid outlet port communicating with said chamber,
   relief conduit means for providing communication between said chamber and said air port, and
   a valve member mounted in said chamber upon said valve seat for motion between a closed position in which the valve seat flow passage is blocked by said valve member and said chamber is in communication with both said outlet port and said air port, and a full flow position in which said relief conduit means is blocked by said valve member and said chamber communicates with both said flow passage and said outlet port.

2. The valve of claim 1 wherein said relief conduit means comprises means for defining a first air passage section between said retainer plug and said valve member, and means for defining a second air passage section between said valve seat and said valve body.

3. The valve of claim 1 wherein said valve member moves through an intermediate position between said closed position and said full flow position in which intermediate position said chamber communicates with all of said flow passage, said outlet port and said relief conduit means, whereby liquid flowing into said inlet port at said one end of the valve body will be discharged partly through said outlet port and partly through said air port at said one end of the valve body.

4. The valve of claim 1 wherein said valve seat is spaced radially inwardly of said valve body to define a part of said relief conduit means.

5. The valve of claim 4 wherein said retainer plug includes relieved portions spaced from said valve member to define a portion of said relief conduit means.

6. The valve of claim 1 wherein said valve body includes a plurality of circumferentially spaced inwardly projecting ribs abutting the exterior periphery of said valve seat to define a portion of said relief conduit means.

7. The valve of claim 1 wherein said valve member comprises a flexible disk having a central aperture, a retainer ring seated upon said disk at the periphery thereof, said retainer plug including a plurality of lugs abutting said retainer ring and defining therebetween a plurality of flow passages that form sections of said relief conduit means interconnecting said chamber and the periphery of aid valve seat.

8. The valve of claim 1 including a valve retainer ring interposed between said retainer plug and said valve member, said retainer plug extending slightly beyond the other end of said valve body, whereby a fitting adapted to be connected to said other end of said valve body will press said plug against said valve retainer ring to hold the ring and valve member in place upon the valve seat.

9. An antisiphon check valve comprising:
   a valve body having an outer wall and a central portion spaced inwardly of said wall at one end of said valve body to define therebetween a plurality of air ports in said one end of said valve body, said central portion having a liquid inlet port therein,
   a valve seat mounted to said central portion and having an inlet flow passage therethrough communicating with said inlet port, said seat having its periphery spaced from said outer wall to define a relief flow passage between said valve body outer wall and the periphery of said valve seat,
   movable valve means for blocking said inlet flow passage in one position and said air ports in another position of said valve means,
   said valve means comprising a single flexible valve disk seated upon said valve seat and having an aperture,
   a valve retainer ring seated upon the surface of said valve disk at the periphery thereof, and
   a retainer plug mounted in the other end of said valve body in abutment with said retainer ring.

10. The valve of claim 9 including a plurality of circumferentially spaced ribs interconnecting said outer wall and said central portion, said valve seat having its periphery in contact with said spaced ribs to space said seat from said wall.

11. The valve of claim 9 wherein said retainer plug includes a plurality of circumferentially spaced axially inwardly extending lugs in contact with said retainer ring for pressing said ring against said valve disk and concomitantly defining flow passages extending from said valve disk to the periphery of said valve seat.

12. The valve of claim 9 wherein said other end of said valve body is threaded, wherein said retainer plug extends slightly beyond the other end of said valve body, and including a connecting fitting threaded upon said other end of said valve body and pressing said retainer plug inwardly of said body toward said retainer ring.

* * * * *

UNITED STATES PATENT AND TRADEMARK OFFICE
CERTIFICATE OF CORRECTION

PATENT NO. : 4,080,981
DATED : March 28, 1978
INVENTOR(S) : ANTHONY F. STEWART

It is certified that error appears in the above-identified patent and that said Letters Patent are hereby corrected as shown below:

Col. 3, line 17: Change "surface" to ---surfaces---;

Col. 4, line 5: Change "projection" to ---projecting---;

Col. 4, line 12: Change "then" to ---tend---;

Col. 6, line 21: Change "aid" to ---said---.

Signed and Sealed this

Fifth Day of September 1978

[SEAL]

Attest:

RUTH C. MASON
Attesting Officer

DONALD W. BANNER
Commissioner of Patents and Trademarks